United States Patent
Boss et al.

(10) Patent No.: US 7,835,730 B2
(45) Date of Patent: Nov. 16, 2010

(54) USING RFID AND SENSORED ZONES TO GEOGRAPHICALLY CONTROL CELLULAR PHONE AUDIO PROFILES

(75) Inventors: Gregory J. Boss, American Fork, UT (US); Vincent V. Diluoffo, Sandy Hook, CT (US); Rick A. Hamilton, II, Charlottesville, VA (US); Timothy M. Waters, Hiram, GA (US)

(73) Assignee: International Business Machines Corporation, Armonk, NY (US)

( * ) Notice: Subject to any disclaimer, the term of this patent is extended or adjusted under 35 U.S.C. 154(b) by 921 days.

(21) Appl. No.: 11/624,456

(22) Filed: Jan. 18, 2007

(65) Prior Publication Data

US 2008/0176578 A1 Jul. 24, 2008

(51) Int. Cl.
*H04M 3/00* (2006.01)
(52) U.S. Cl. ............... 455/419; 455/418; 455/456.3; 455/456.4; 455/567; 379/207.16; 379/373.01; 379/374.03; 379/376.02
(58) Field of Classification Search ............ 455/412.1, 455/412.2, 414.1, 418–420, 456.1, 456.2, 455/456.3, 456.6, 567, 569.1, 570, 550.1, 455/456.4, 569.2; 379/201.01, 207.16, 373.01, 379/373.02, 373.03, 374.03, 374.02, 376.02
See application file for complete search history.

(56) References Cited

U.S. PATENT DOCUMENTS

| | | | | |
|---|---|---|---|---|
| 5,479,476 A * | 12/1995 | Finke-Anlauff | ............. | 455/566 |
| 5,778,304 A * | 7/1998 | Grube et al. | ............. | 455/456.4 |
| 6,366,791 B1 * | 4/2002 | Lin et al. | ............. | 455/567 |
| 6,408,187 B1 * | 6/2002 | Merriam | ............. | 455/458 |
| 6,701,144 B2 * | 3/2004 | Kirbas et al. | ............. | 455/417 |
| 6,807,574 B1 | 10/2004 | Partovi et al. | | |
| 6,842,767 B1 | 1/2005 | Partovi et al. | | |
| 6,898,445 B2 * | 5/2005 | Slettengren et al. | ......... | 455/567 |
| 6,907,254 B1 * | 6/2005 | Westfield | ............. | 455/456.4 |
| 6,961,579 B2 * | 11/2005 | Inukai et al. | ............. | 455/456.4 |
| 6,990,333 B2 * | 1/2006 | Andrew et al. | ............. | 455/414.1 |
| 7,027,832 B2 * | 4/2006 | Gum | ............. | 455/550.1 |
| 7,069,027 B2 * | 6/2006 | Miriyala | ............. | 455/456.4 |
| 7,209,705 B2 * | 4/2007 | Moles et al. | ............. | 455/41.2 |
| 7,295,858 B2 * | 11/2007 | Fan et al. | ............. | 455/550.1 |
| 7,493,125 B2 * | 2/2009 | Nagesh et al. | ............. | 455/456.1 |
| 7,697,943 B2 * | 4/2010 | Jung | ............. | 455/456.3 |
| 2002/0198004 A1 * | 12/2002 | Heie et al. | ............. | 455/456 |
| 2004/0033819 A1 * | 2/2004 | Hymel | ............. | 455/567 |
| 2004/0127241 A1 | 7/2004 | Shostak | | |
| 2004/0203644 A1 * | 10/2004 | Anders et al. | ............. | 455/414.1 |
| 2006/0019645 A1 * | 1/2006 | Azimi et al. | ............. | 455/419 |
| 2006/0116116 A1 * | 6/2006 | Slemmer et al. | ............. | 455/418 |
| 2006/0128368 A1 * | 6/2006 | Kim | ............. | 455/418 |
| 2006/0270463 A1 * | 11/2006 | Copperman | ............. | 455/567 |
| 2007/0098195 A1 * | 5/2007 | Holmes | ............. | 381/315 |
| 2008/0125102 A1 * | 5/2008 | Abel et al. | ............. | 455/418 |

* cited by examiner

*Primary Examiner*—Charles N Appiah
*Assistant Examiner*—Olumide T Ajibade Akonai
(74) *Attorney, Agent, or Firm*—Cahn & Samuels LLP

(57) ABSTRACT

A system and method for automatically controlling and adjusting the audio profile of pervasive devices, like cellular phones, within controlled zones. The system and method utilizes RFID and sensors to geographically control and adjust the audio profiles based on set criteria, such as default settings and hierarchy. The audio profiles may be controlled or adjusted based on a control zone profile settings or based on the profile settings of other individual devices within the same control zone. The zones may be adjusted due to the hierarchy or rank of devices present within the zone.

15 Claims, 3 Drawing Sheets

```xml
<?xml version="1.0" encoding="UTF-8"?>

<!ELEMENT Device (Owner, DeviceAttr)>

<!ELEMENT Owner EMPTY>
<!ATTLIST Owner
Title CDATA #REQUIRED
FirstName CDATA #IMPLIED
LastName CDATA #IMPLIED
Email  CDATA #REQUIRED
>

<!ELEMENT DeviceAttr (Feature*)>
<!ATTLIST DeviceAttr
 Name CDATA #REQUIRED
 Model CDATA #REQUIRED
 Description CDATA #REQUIRED
 OSName CDATA #REQUIRED
 OSversion CDATA #REQUIRED
>

<!ELEMENT Feature (Resource, Security*)>
<!ATTLIST Feature
FeatureName CDATA #REQUIRED
FeatureVersion CDATA #REQUIRED
FeatureDescription  CDATA #REQUIRED
FeatureOptional CDATA #REQUIRED
>

<!ELEMENT Resource EMPTY>
<!ATTLIST Resource
 Name CDATA #REQUIRED
 Version CDATA #REQUIRED
 Description CDATA #REQUIRED
 OptionalValues CDATA #REQUIRED
>

<!ELEMENT Security EMPTY>
<!ATTLIST Security
AuthenticationType CDATA #REQUIRED
AuthenticationVersion CDATA #REQUIRED
AuthorizationLevel CDATA #REQUIRED
>
```

FIG. 3

USING RFID AND SENSORED ZONES TO GEOGRAPHICALLY CONTROL CELLULAR PHONE AUDIO PROFILES

I. FIELD OF THE INVENTION

This invention relates to a system and method of controlling the audio profile of pervasive devices, such as cellular phones, in censored zones by using sensors and controllers that support dynamic behavior.

II. BACKGROUND OF THE INVENTION

Pervasive devices have become an increasingly prevalent part of our lives. Pervasive devices generally include mobile devices such as cellular phones, pagers, computers, and other similar communications devices. In some instances this group may also include similar stationary devices. These devices make our lives more convenient and productive. However, there also exist some drawbacks. For example, these devices and their many audio levels and alerts, in addition to their users, can often be offensive and obtrusive in many environments.

There are several instances of censored or quieted environments where reduced or eliminated sound levels are required or desirable. Some examples of quieted environments are libraries, churches, theaters, workplaces, restaurants, classrooms, etc.

Pervasive devices generally are manually controlled by the user of the device. This means users must turn off the ring and/or other audible functions on the device when entering certain quieted environments, such as libraries, churches, theaters, workplaces, etc., in order to avoid disturbing others. One drawback to such devices is that users must be conscious of the environment and manually adjust the pervasive device before entering the environment or before using the device in order to prevent disturbing the quieted environment. Similarly, the user must remember to turn the ringer and/or other audible function back on after leaving the quieted environment in order to avoid missing calls or messages.

There currently exist several devices that are geared towards controlling pervasive devices. Generally, these devices are somewhat crudely designed and lack any intelligence as they act to disable all communications. For example, many of these devices "jam" all communications within a control area without regard to the environment or the devices whose communications they "jam". These devices do not allow intelligent processing, account for system or user preferences, or allow for overrides for emergencies or other privileges.

Therefore a need still exists for a system and method for controlling pervasive devices within quieted environments or censored zones using sensors and controllers that support dynamic behavior such that the control is performed intelligently based on any number of policy considerations that may be programmed into the controller.

III. SUMMARY OF THE INVENTION

This invention in at least one embodiment provides an apparatus for controlling the audio profile of pervasive devices, comprising at least one sensor placed within a control zone; and a controller in communication with said at least one sensor, said controller having an audio profile setting, wherein said at least one sensor detects the presence of at least one pervasive device within said control zone and transmits an audio profile of said at least one pervasive device to the controller.

This invention in at least one embodiment provides a method for controlling the audio profile of pervasive devices, comprising placing at least one sensor within a control zone; providing at least one controller in communication with said at least one sensor, said at least one controller having an audio profile setting; detecting the presence of at least one pervasive device within said control zone; and transmitting an audio profile of said at least one pervasive device to said at least one controller.

This invention in at least one embodiment provides a computer program product comprising a computer useable medium including a computer readable program, wherein the computer readable program when executed on a computer causes the computer to receive an audio profile of at least one pervasive device in a controlled zone; determine whether there is a conflict between the audio profile of said at least one pervasive device and a stored audio profile setting for the controlled zone; determine precedence of audio profiles based on a hierarchy of considerations; and, determine whether said at least one pervasive device has a higher priority than said stored audio profile setting.

This invention in at least one embodiment provides a data processing system comprising means for receiving an audio profile signal from at least one pervasive device within a controlled zone; means for determining whether there is a conflict between the audio profile of said at least one pervasive device and a stored audio profile setting for the controlled zone; means for determining precedence of audio profiles based on a hierarchy of considerations; and, means for determining whether said at least one pervasive device has a higher priority than the controlled zone.

IV. BRIEF DESCRIPTION OF THE DRAWINGS

The present invention is described with reference to the accompanying drawings, wherein.

Figure 1:
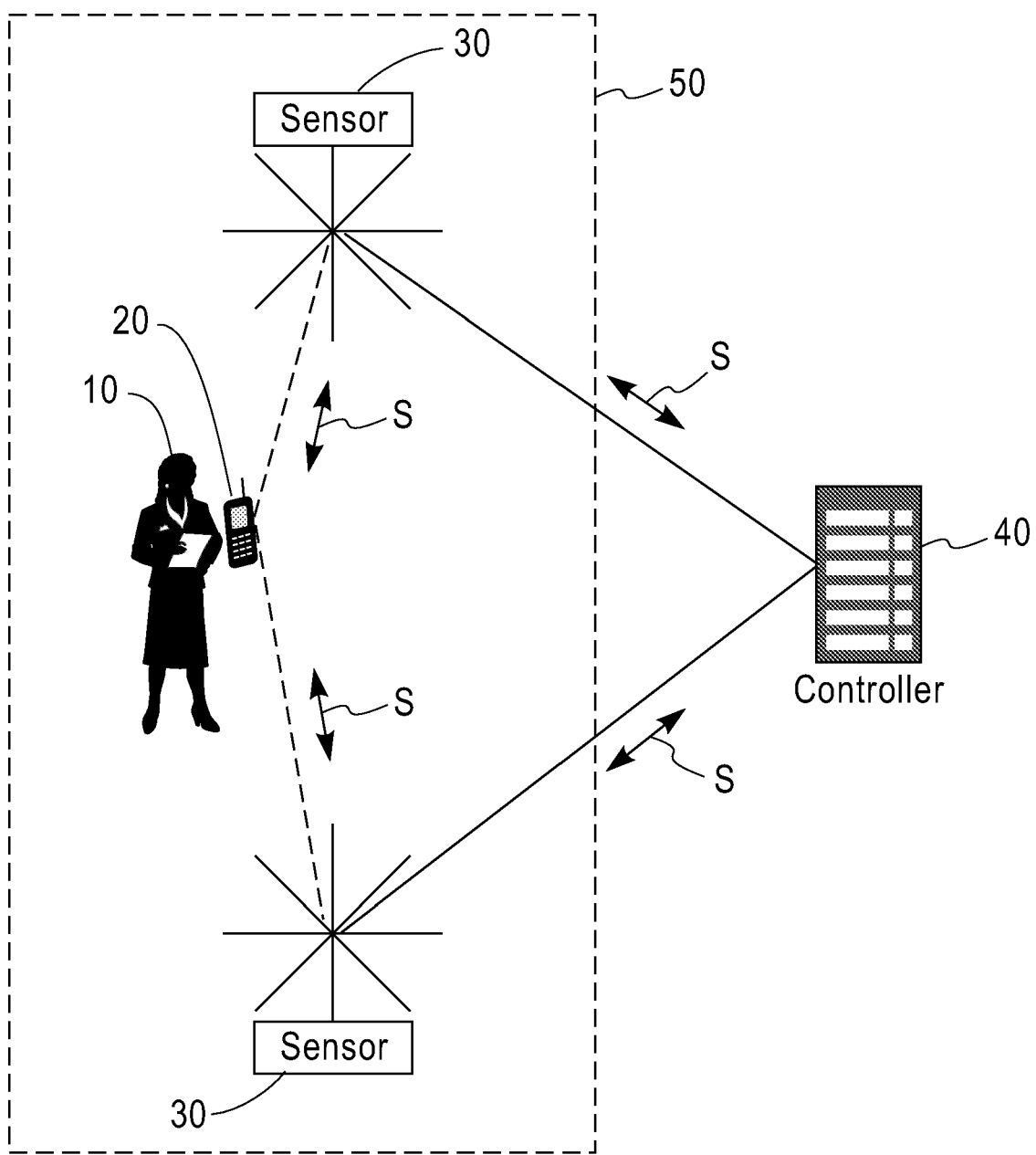
FIG. 1 illustrates an exemplary overview of the present invention.

FIG. 3 lists an exemplary program code listing of a user profile in accordance with the present invention.

Given the following enabling description of the drawings, the invention should become evident to a person of ordinary skill in the art.

V. DETAILED DESCRIPTION OF THE DRAWINGS

The present invention in at least one exemplary embodiment provides a system and method that utilizes a user profile to control pervasive devices. The pervasive device stores the user profile such that the surrounding environment can control the device based on the user profile by utilizing sensors and controllers that have dynamic behavior. The sensors and controllers may control the pervasive devices based on a variety of policy considerations, including but not limited to set logic, priority, authorization, hierarchy, relationship (family, customer, etc.), identification information (name, phone number, email, etc.), device attributes and capabilities (phone, email, text messaging, music, etc.), and other factors that collectively makeup the devices profile setting. These considerations can be programmed into the controller such that the controller can compare/weigh the considerations, include the device in the controller's registry, and automatically change the censored zone audio profile to the appropriate setting based on the devices (and associated profiles) that are in the censored zone.

The present invention utilizes at least one sensor in communication with a controller to create a censored zone. The pervasive devices communicate with the sensors in the censored zone wirelessly, e.g. via a Radio Frequency Identification (RFID) chip stored or embedded on the device or on the controller integrated to the device. Examples of devices having an appropriate embedded RFID chip are WebSphere RFID Device Infrastructure devices available from IBM Corporation (White Plains, N.Y.) or one of its business partners. The controller is capable of both receiving and transmitting data to and from the sensors by also using RFID signals. Importantly, the controller deduces the data received from the sensors based on the particular logic or policy in use and transmits a control response to the sensor such that pervasive devices are appropriately controlled. The controller is designed to support manufacturer's protocols instead of individual device models. This functions to insulate against system disruptions due to the introduction of new device models. An example of a suitable controller for use with the current application is a WebSphere RFID Premises Server also available from IBM Corporation. The sensors are capable of both receiving and transmitting data to and from a pervasive device and the controller using RFID signals. An example of a suitable sensor is the Three Channel Transceiver model (3D AFE) TMS 37122 from Texas Instruments Incorporated (Dallas, Tex.).

In use the sensor(s) in the censored zone periodically send out a control signal or "scan" of the zone. This scan is sensed by any present pervasive devices having an RFID chip. The pervasive device then responds to the sensor(s) by sending an RFID signal containing the devices unique ID profile or policy setting. The profile contains relevant information related to the device and user including, for example, the device attributes and capabilities, user identification information, priority, authorization, hierarchy, relationship, etc. When the controller receives new device information, the controller profile settings may be updated based on this new information. This is particularly true when the new device has a higher policy setting (priority, authorization, etc.) than the controller. In that event, the new device profile would cause the controller settings to be updated based on the new device's profile. The process occurs continually such that the system quickly senses when a device enters or leaves a censored zone. The controller profile setting for the censored zone is appropriately updated based on the new device's profile. These new controller settings are then proliferated to all other devices in the censored zone.

FIG. 1 illustrates an exemplary overview of the system of the present invention. When a person(s) or user(s) 10 having a pervasive device(s) 20, such as a cellular phone, enters a censored zone 50, such as a hospital, sensor(s) 30 within the zone 50 detect the presence of the device 20 as described above. The sensor(s) 30 then transmit a signal S containing the device's profile to the controller 40. The controller 40 processes the device's profile by comparing it to the profile setting of the controller 40 as well as the profiles of other present devices. The controller 40 then outputs a control signal S to the sensors 30 based on the processed settings. The sensors 30 then transmit the control signal S to the pervasive device(s) 20 to appropriately control the present devices. This process repeatedly cycles in order to continually control the present pervasive devices based on the profiles present. Any number of sensors 30 may be used as appropriate for the size of the censored zone 50.

The following exemplary use will provide an illustration of how the present invention might be utilized. In a business environment, for example, the audio profiles for a certain zone may be set based on company hierarchy whereby executive level employee's profile settings override the controller settings and/or whereby executive's profile settings control the profile settings of lower level employees.

In this example, a censored zone has a controller setting which only allows device profiles of silent or vibrate. An executive level employee having the title Vice President (VP) walks into a censored zone. The VP's profile settings are exchanged between sensor(s) mounted in the censored zone and the VP's pervasive device as described above. The VP's device, in this case a cell phone, is allowed to ring if the profile setting meets or exceeds the authorization level for the censored zone stored on the controller. If the profile setting does not meet the authorization level, the phone is changed into a silent or vibration mode as determined by the controller.

In order to determine whether the authorization level is met by the device, the exchange of data between the cell phone and the sensor is interpreted by the controller. The controller checks the authorization level of the cell phone against the controller's record and determines that the cell phone's authorization level exceeds that required by the controller. The controller then transmits a response signal to the sensors. The sensors in turn communicate the response signal to the device. This response signal would allow the executive's phone, unlike the phones of other lower level employees, to audibly ring. This process allows the dynamics of the censored zone to be automatically changed according to an established logic or policy between the censored zone profile setting and the profiles of devices present.

The technique of the present invention allows pervasive devices containing a user profile that expresses the device features to be transmitted to sensor(s) in the zone. The sensor(s) then transmit the data to the controller to deduce the appropriate logic and send a response signal to the sensor(s). The sensor(s) then communicate the deduced logic to the pervasive device(s).

Figure 2:
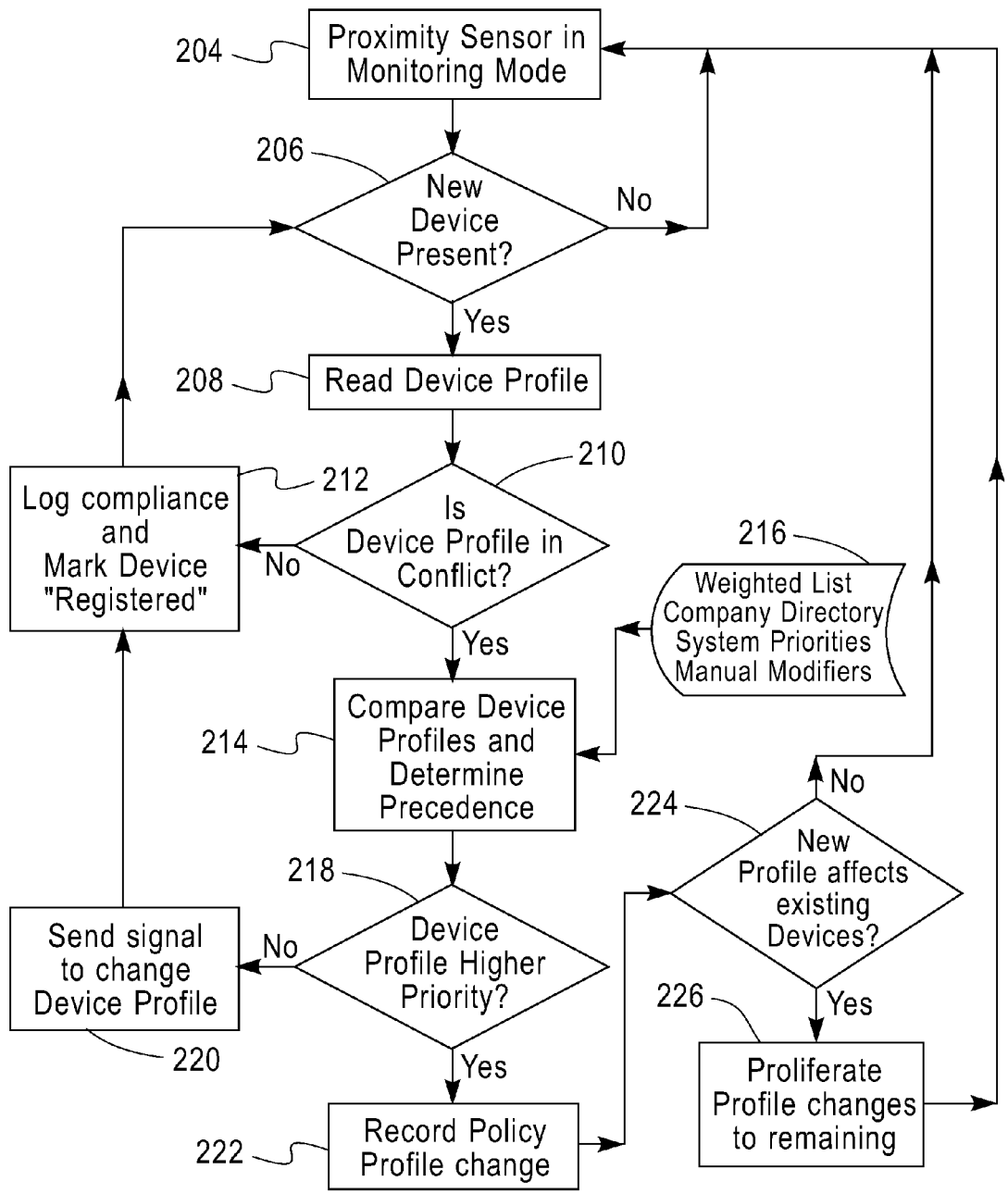
FIG. 2 illustrates a flowchart representing the process of determining the appropriate action when detecting the presence of a new device in order to resolve conflicting audio profiles in accordance with an exemplary embodiment of the present invention.

FIG. 2 illustrates the logical process for determining the appropriate action to take when a new device enters or leaves a zone and how conflicting profiles are resolved. The process begins, at step 204, with the sensor(s) in monitoring mode. At step 206, the process determines whether a new device is present via RF signals. If there is no new device present the process cycles back to step 204. If there is a new device present, at step 206, the process proceeds to step 208 and reads the device profile. The process then proceeds to step 210 and determines whether the device profile is in conflict with the controller profile setting. If the device is not in conflict, the process proceeds to step 212, logs the devices compliance and marks the device as "registered". The process would then cycle back to step 206.

If it is determined at step 210 that the device profile is in conflict with the controller profile setting, the process proceeds to step 214, compares the profile settings and determines setting precedence. Setting precedence may be determined based on a weighted list of policy considerations 216 including, for example, company directory (job title or hierarchy), system priorities, manual modifiers (settings), etc. Other policy considerations may also be programmed into the controller and reflected in the weighted list such that pervasive devices are appropriately controlled in the censored zone.

The process then proceeds to step 218 and determines whether the device profile has a higher setting or priority than the controller. If it is determined that the device profile does not have a higher setting, the process proceeds to step 220 and a signal is transmitted from the controller to facilitate changing the device's profile to comply with the controller setting. The process would then proceed to step 212, log the devices compliance, mark the device as "registered" and cycle back to step 206. If, at step 218, it is determined that the device profile does have a higher setting, the process proceeds to step 222 and updates the controller setting to record the profile setting change.

Next, at step 224, the process determines whether the new profile affects existing devices. If the new profile does not affect existing devices, the process cycles back to step 204 and repeats itself. If the new profile does affect existing devices, the process proceeds to step 226 and proliferates the profile changes to the other devices. An example of when a new profile might affect other devices may be, for instance, when the new profile includes updates or additional parameters. Upon completion of the proliferation of profile changes, the process cycles back to step 204 and runs from the beginning.

The process defined above illustrates the logical steps performed by the present invention in determining controller and device profile settings based on new devices entering a censored area. This process is further illustrated with respect to the following practical examples.

Business Conference Room

In this environment, a conference room defining a censored zone has been setup having a default profile setting programmed into a "controller." The default profile setting, in this example, allows phones to ring but only at the lowest possible volume for which the device is capable. Three employees, each having cellular phones, walk into the conference room and begin using the facilities. Upon the employees' entry into the conference room, sensors detect the presence of their cellular phones. The sensor receives an audio profile setting signal from each employee's phone and transmits the profiles for each phone to the controller. The controller compares the profiles of each phone to the default profile stored in the controller. The controller recognizes that neither phone has a higher priority than the default profile and transmits a response signal to the sensors whereby the sensors communicate the signal to each affected phone. The response signal changes the audio profile setting of each phone to ring at the lowest ring volume.

One hour later, a company Vice President enters the same conference room where the other three employees remain. The VP's phone profile setting reflects his preference for any conference room meeting that he attends to have a profile setting of vibrate or lower. When the VP enters the conference room, sensors detect the presence of his cellular phone. The sensors receive an audio profile setting signal from the VP's phone and transmit the profile setting to the controller. The controller compares the phone's profile setting to the default profile setting stored in the controller and recognizes that the VP's phone profile has a higher priority than the default profile setting. Therefore, the controller updates the default profile setting to comply with the VP's phone profile setting.

The controller also generates and transmits a response signal to the sensors whereby the sensors relay the signal to each affected phone. The response signal changes the audio profile setting of each affected phone to ring vibrate or silent. In determining which profile setting has a higher priority, the controller compares the audio profile settings and deduces that a VP profile outweighs the conference rooms default profile through comparison of the policy considerations which in this case include, among other things, a company directory with associated weights based on job title (Weighted List 216). The controller then automatically proliferates the "vibrate only" setting to the other three employee's phones in that conference room.

Some time later the VP leaves the conference room. The sensors detect that the VP's device is no longer present, thus removing the higher profile setting from the controller profile setting. The controller then reverts back to the default profile setting and transmits a corresponding signal to the sensors. The sensors then transmit the signal to the affected devices. As a result, the remaining three employees' phones are automatically turned back to low volume ring in compliance with the default profile setting.

Concert Hall

In this environment, a musical concert hall defining a censured zone has been setup to have a default profile setting programmed into a "controller". The default profile setting, in this example, allows phones to either ring silent or not ring. A Doctor who happens to be on call enters the concert hall with her cellular phone. Upon the Doctors entry into the concert hall, sensors detect the presence of her cellular phone. The sensors receive an audio profile setting signal from the Doctor's phone and transmit the profile to the controller. The controller compares the profile setting of the Doctor's phone to the default profile stored in the controller. Since the Doctor could receive a life threatening emergency call her profile setting overrides (by means of the Weighted List 216) the default concert hall profile in order to allow her to receive important calls.

In this environment, unlike the conference room example, the Doctor's profile setting is not updated to the controller or proliferated to other devices. There is no need to change other unrelated devices' profiles based on the Doctor's profile setting, particularly in the concert hall environment. Further, because of the nature of the environment, the Doctor's phone may be put into a graduated volume profile which begins with a silent ring, progresses to a vibrating ring, and then on to a lower volume short audible ring, and finally on to a longer louder ring. This graduation of increasing volume may be programmed to persist until the phone is picked up or up to the maximum number of rings allowed by the dominant profile. In this example, only the Doctor's cell phone remains in vibrating ring mode (with graduated volume). These changes are not proliferated to others in the hall.

The user profile setting elements may be expressed in XML or other suitable language and describe the configurable features of the device. In addition, the system of the present invention may require authentication and authorization.

FIG. 3 lists an exemplary Document Type Definition (DTD) of a user profile. DTD is a type of XML schema language and may be used to express the "syntax" XML. In this example, XML is utilized as a medium to share information between two processes while maintaining the needed integrity (scheme) and security of the processes.

A populated XML document is sent to the sensor when a pervasive device of is detected via an RF signal. Since all communications are RF signal, no specific device/reader match is required. The XML structure is then passed into the controller to view its own policy. The controller may then group the elements into a hierarchy based on programmed considerations, for example user identification information at the top of the hierarchy followed by Title and then optional features. This grouping allows the controller to inference the data for corrective actions. Each feature must have an authorization level set, so that the controller can process the feature.

The logic is then sent back to the sensor for it to respond to the device. In some cases, no action would be required, in others it may require that options be reconfigured for the zone's behavior. The overall performance of obtaining and processing the data is relatively low in latency. The small amount of data being communicated and processed contributes to a high performance environment.

The invention allows for the automatic control of pervasive device audio profiles based on a variety of considerations, including environment, location, priorities, use, time, as well as many other unlisted considerations.

The invention can take the form of an entirely hardware embodiment, an entirely software embodiment or an embodiment containing both hardware and software elements. In at least one exemplary embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As will be appreciated by one of ordinary skill in the art, the present invention may be embodied as a computer implemented method, a programmed computer, a data processing system, a signal, and/or computer program. Accordingly, the present invention may take the form of an entirely hardware embodiment, an entirely software embodiment or an embodiment combining software and hardware aspects. Furthermore, the present invention may take the form of a computer program on a computer-usable storage medium having computer-usable program code embodied in the medium. Any suitable computer readable medium may be utilized including hard disks, CD-ROMs, optical storage devices, carrier signals/waves, or other storage devices.

Computer program code for carrying out operations of the present invention may be written in a variety of computer programming languages. The program code may be executed entirely on at least one computing device, as a stand-alone software package, or it may be executed partly on one computing device and partly on a remote computer. In the latter scenario, the remote computer may be connected directly to the one computing device via a LAN or a WAN (for example, Intranet), or the connection may be made indirectly through an external computer (for example, through the Internet, a secure network, a sneaker net, or some combination of these).

It will be understood that each block of the flowchart illustrations and block diagrams and combinations of those blocks can be implemented by computer program instructions and/or means. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the flowcharts or block diagrams.

The exemplary embodiments described above may be combined in a variety of ways with each other. Furthermore, the steps and number of the various steps illustrated in the figures may be adjusted from that shown.

It should be noted that the present invention may, however, be embodied in many different forms and should not be construed as limited to the embodiments set forth herein; rather, the embodiments set forth herein are provided so that the disclosure will be thorough and complete, and will fully convey the scope of the invention to those skilled in the art. The accompanying drawings illustrate exemplary embodiments of the invention.

Although the present invention has been described in terms of particular exemplary embodiments, it is not limited to those embodiments. Alternative embodiments, examples, and modifications which would still be encompassed by the invention may be made by those skilled in the art, particularly in light of the foregoing teachings.

Those skilled in the art will appreciate that various adaptations and modifications of the exemplary embodiments described above can be configured without departing from the scope and spirit of the invention. Therefore, it is to be understood that, within the scope of the appended claims, the invention may be practiced other than as specifically described herein.

VI. INDUSTRIAL APPLICABILITY

The above-described invention is useful for automatically adjusting the audio profiles of pervasive devices such as cellular phones within controlled zones. The invention utilizes policy considerations and weighted comparisons to automatically adjust the device settings based on the policy. The invention is particularly useful in providing a means for avoiding unwanted disturbances due to the user alerting function of pervasive devices while allowing important communications to still be received.

We claim:

1. An apparatus for controlling the audio profile of pervasive devices, comprising:
   at least one sensor placed within a control zone; and,
   a controller in communication with said at least one sensor, said controller having an audio profile setting, wherein said at least one sensor detects the presence of at least one pervasive device within said control zone and transmits an audio profile of said at least one pervasive device to the controller, said controller receives the transmitted audio profile and determines whether there is a conflict between the audio profile setting of the at least one pervasive device and the controller audio profile setting, and determines precedence of audio profiles based on a hierarchy of policy considerations.

2. An apparatus according to claim 1, wherein said hierarchy of policy considerations includes at least one of the following factors: set logic, priority, authorization, hierarchy, relationship, identification information, device attributes and capabilities, system priorities and manual settings.

3. An apparatus according to claim 1, wherein said controller determines whether said at least one pervasive device has a higher priority than the controller.

4. An apparatus according to claim 3, wherein said controller changes the audio profile of said at least one pervasive device to comply with said controller audio profile setting when the pervasive device does not have a higher priority than the audio profile of the controller.

5. An apparatus according to claim 3, wherein said controller changes and records its audio profile setting based on said at least one pervasive device when the audio profile setting of the pervasive device has a higher priority than the audio profile of the controller.

6. A method for controlling the audio profile of pervasive devices, comprising:

placing at least one sensor within a control zone;

providing at least one controller in communication with said at least one sensor, said at least one controller having an audio profile setting;

detecting the presence of at least one pervasive device within said control zone;

transmitting an audio profile of said at least one pervasive device to said at least one controller;

receiving the transmitted audio profile of said at least one pervasive device;

determining whether there is a conflict between the audio profile of said at least one pervasive device and the controller audio profile setting; and determining precedence of audio profiles based on a hierarchy of considerations, wherein said hierarchy of considerations includes at least one of the following factors: set logic, priority, authorization, hierarchy, relationship, identification information, device attributes and capabilities, system priorities and manual settings.

7. A method according to claim 6, further comprising: determining whether said at least one pervasive device has a higher priority than the controller.

8. A method according to claim 7, further comprising: changing the audio profile of said at least one pervasive device to comply with the controller audio profile setting when the pervasive device does not have a higher priority than the controller.

9. A method according to claim 7, further comprising: changing and recording an audio profile setting of said controller based on said at least one pervasive device when the audio profile setting of said at least one pervasive device has a higher priority than the controller.

10. A computer program product comprising a non-transitory computer useable medium including a computer readable program, wherein the computer readable program when executed on a computer causes the computer to: receive an audio profile of at least one pervasive device in a controlled zone; determine whether there is a conflict between the audio profile of said at least one pervasive device and a stored audio profile setting for the controlled zone; determine precedence of audio profiles based on a hierarchy of considerations; and, determine whether said at least one pervasive device has a higher audio profile priority than said stored audio profile setting.

11. A computer program product according to claim 10, wherein the computer readable program further causes the computer to:

transmit a signal that updates the audio profile of said at least one pervasive device to comply with said stored audio profile setting of the controlled zone when said at least one pervasive device does not have a higher priority than the controlled zone.

12. A computer program product according to claim 10, wherein the computer readable program further causes the computer to:

update the audio profile setting of the controlled zone to comply with the audio profile setting for said at least one pervasive device when said at least one pervasive device has a higher priority than the controlled zone.

13. A data processing system comprising: means for receiving an audio profile signal from at least one pervasive device within a controlled zone; means for determining whether there is a conflict between the audio profile of said at least one pervasive device and a stored audio profile setting for the controlled zone; means for determining precedence of audio profiles based on a hierarchy of considerations; and, means for determining whether said at least one pervasive device has a higher audio profile priority than audio profile of the controlled zone.

14. A data processing system according to claim 13, further comprising:

means for transmitting a signal that updates the audio profile of said at least one pervasive device to comply with the stored audio profile setting for the controlled zone when said at least one pervasive device does not have a higher priority than the controlled zone.

15. A data processing system according to claim 13, further comprising:

means for updating the audio profile setting of the controlled zone to comply with the audio profile setting for said at least one pervasive device when said at least one pervasive device has a higher priority than the controlled zone.

* * * * *